Aug. 21, 1928.

I. F. BURTON 1,681,393

SPRING MOTOR

Filed May 21, 1924    5 Sheets-Sheet 1

Inventor
Isaac F. Burton, deceased,
by Manie E. Burton, executrix.

Witness:
Walter Edison by
Attorney.

Aug. 21, 1928.
I. F. BURTON
1,681,393
SPRING MOTOR
Filed May 21, 1924　　5 Sheets-Sheet 2
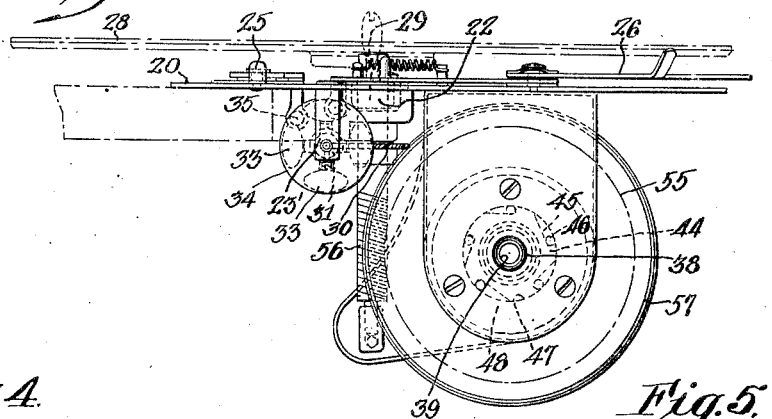
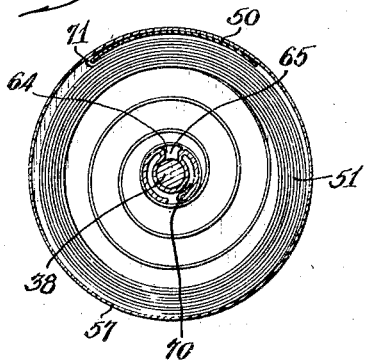
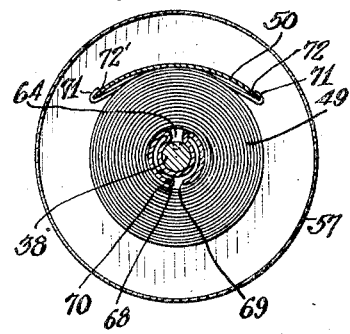
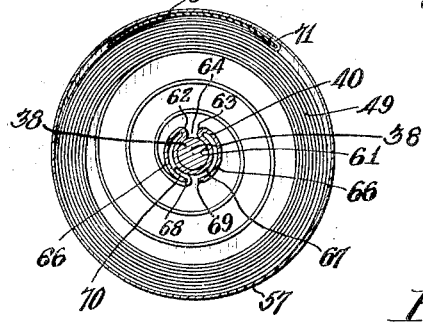
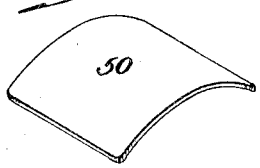
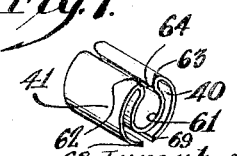
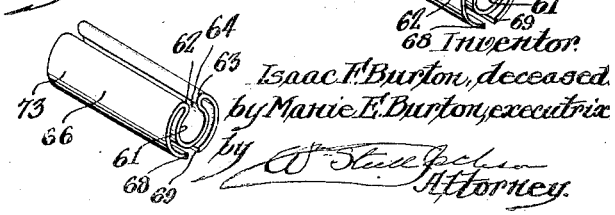

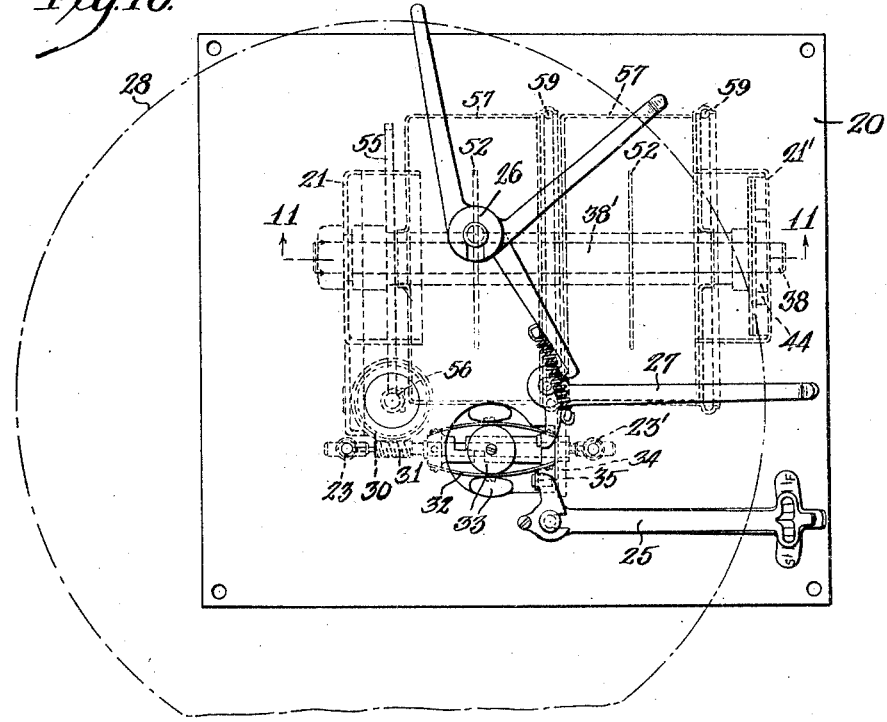

Aug. 21, 1928.

I. F. BURTON 1,681,393

SPRING MOTOR

Filed May 21, 1924      5 Sheets-Sheet 4

Inventor
Isaac F. Burton, deceased
by Marie E. Burton, executrix.

Witness:

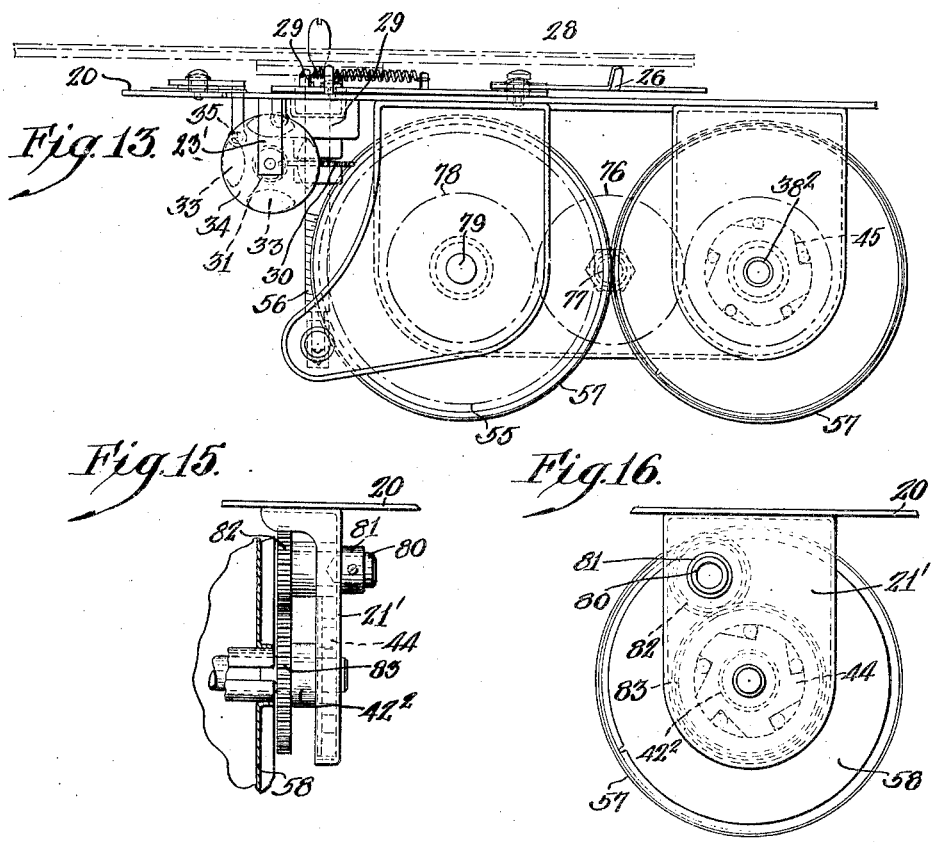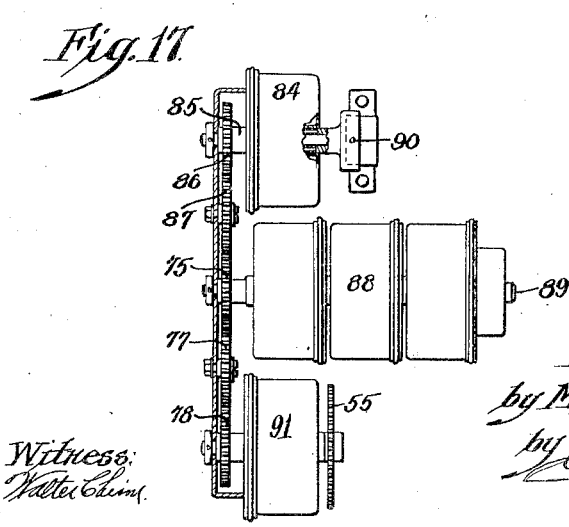

Patented Aug. 21, 1928.

1,681,393

UNITED STATES PATENT OFFICE.

ISAAC F. BURTON, DECEASED, LATE OF PHILADELPHIA, PENNSYLVANIA, BY MANIE E. BURTON, EXECUTRIX OF PHILADELPHIA, PENNSYLVANIA, ASSIGNOR TO VISUALATONE COMPANY OF AMERICA, OF PHILADELPHIA, PENNSYLVANIA, A CORPORATION OF DELAWARE.

SPRING MOTOR.

Application filed May 21, 1924. Serial No. 714,797.

The invention relates to motors capable of use for any purpose but for convenience of illustration and because of intended immediate use with phonographs, illustrated in conjunction with phonographs.

One purpose of the invention is to provide a floating coupling plate between the outer end of a spiral spring and the outer end of a second spring oppositely spiraled and axially spaced from the first, permitting the plate to float radially and circumferentially around the common axis during coiling and uncoiling of the linked springs.

A further purpose is to improve the character of connection with a uniting or coupling sleeve and with a coupling plate.

A further purpose is to provide a novel form of interior sleeve for energy transmission to and from the springs, for interior coupling between adjacent pairs of springs, interior coupling between the spring at one end of a composite series of springs and a winding element, and interior coupling between the spring at the other end of the composite spring and the element for power transmission.

A further purpose is to use sleeves interchangeably for driving the initial spring or for transmitting energy from the final spring of a pair or series and to utilize sleeves which may be of the same character but of greater length to secure floating connection between the oppositely spiraled adjoining springs of oppositely spiraled pairs of springs.

A further purpose is to reduce the weight, improve the strength and resilience and simplify the manufacture of the winding and coupling sleeves.

A further purpose is to provide a floating and preferably a sleeve connection between adjacent springs of coaxial adjacent pairs of oppositely spiraled springs.

A further purpose is to provide for grouping of sets of springs upon axes out of line and preferably parallel whether one or more pairs of springs comprise each set.

A further purpose is to adapt connected sets about different axes, comprising pairs of oppositely spiraled springs to drive a single spindle or a set of spindles as desired.

The invention relates to the methods involved and also to the structure by which these methods may be carried out.

Further purposes will appear in the specification and in the claims.

It is preferred to illustrate the invention by the development of one form only with several different groupings by which it may be carried out, selecting a form and groupings which are simple, compact, practical and effective and which at the same time well illustrate the principles involved.

Figure 2 is an end elevation of the structure seen in Figure 1.

Figure 4 is a section of Figure 3 taken on line 4—4, showing the spring relaxed.

Figure 5 is a section corresponding to Figure 4 showing the spring wound.

Figure 6 is a section of Figure 3 taken upon the line 6—6 to show the second spring of the pair.

Figures 7, 8 and 9 are perspective views of two coupling sleeves and a coupling plate respectively, utilized in Figures 1 to 6.

Figure 10 is a top plan view corresponding to Figure 1 but having two spring unit pairs about a common shaft.

Figure 11 is the section upon line 11—11 of Figure 10.

Figure 12 is a top plan view corresponding to Figures 1 and 10 but showing additional unit pairs of springs used for a longer run.

Figure 13 is a side elevation of the section seen in Figure 12.

Figures 15 and 16 are fragmentary side and end elevations showing gearing reversing the direction of winding.

In the drawings similar numerals indicate like parts.

Figure 1:
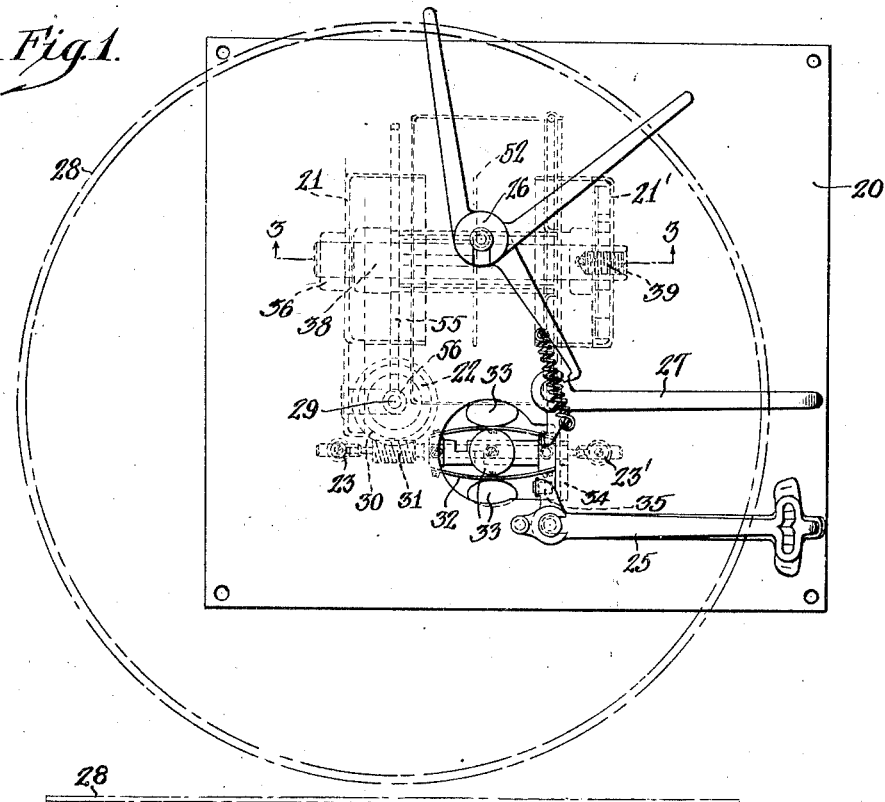
Figure 1 is a top plan view of a phonograph record driving mechanism.
Figure 3:
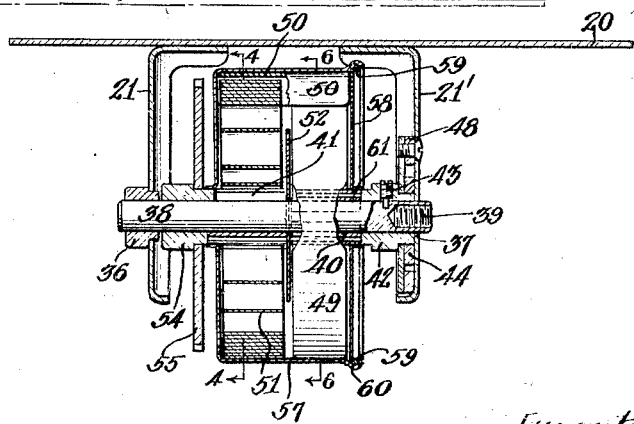
Figure 3 is a section on the line 3—3 of Figure 1.

Describing in illustration and not in limitation and referring to the drawings:—

The invention is directed primarily to the compact assemblage and the coupling of springs to provide a composite spring of any desired length having a minimum size and friction in the connections, for use with spring motors to give runs of any desired length and strength.

Any desired number of alternately oppositely spiraled springs are arranged along and around a common shaft and connected in series, providing circumferentially and radially floating connection between the exterior ends within each pair of as many pairs of springs as may be used and to provide a loose sleeve connection between the interior ends of the adjoining springs of adjoining pairs to form a composite spiral spring. One end of the composite spring connects to and drives the load while the other, normally the winding point, when wound is held against unwinding.

Any desired number of such composite spring elements are connected, each about a different axis, to operate in series by means of suitable gearing, locating the shafts with respect to auxiliary apparatus or to one another according to need and circumstance, and winding the whole composite element at any desired part of the series gearing. It is preferred to wind at the held end of the composite series, and where there are a plurality of composite elements about different shafts or axes. It is usually preferred to place the shafts parallel to one another.

As the basis of the composite spring a spring pair is utilized one form of which is shown in the figures as coupled up with and driving the mechanism of a phonograph which phonograph structure for simplicity and to show the interchangeability of the forms of spring shown has been retained the same throughout the illustrations. It is wished to make clear however, as will be obvious by the invention itself, that it is in no way limited to phonograph use but may be applied to any of the varied uses for which springs have been applied in the past as well as to additional uses for which the limitations of previous springs have hitherto rendered them unsuitable.

The motor mounting plate 20 is shown as supporting all of the parts illustrated, including the two brackets 21, 21' by which the spring assemblage is carried.

The bearing support for the turntable is shown at 22 and bearings for the governor at 23, 23'. The separate control 25 and the stop arms 26, 27 are pivotally secured to the plate by screws. A turntable 28 is illustrated in dot and dash.

The governor and its associated mechanism, including the stop devices is illustrated and described fully in the application copending herewith, bearing Serial No. 8823 for Governor and governor stop, and for that reason will not be described in the same detail here. It has nothing to do with the present invention and is included for completeness of illustration only.

In general the governor is driven from the turntable shaft 29 through a pair of gears 30 and 31. The revoluble spring arms 32 are bent outwardly by the balls 33 and draw the disc 34 toward the stop 35 whose position is adjustably controlled by the position of the arm 25.

Applying the description particularly now to Figures 1 to 9 the spring unit pair in conjunction with the particular mounting used for it when a single pair only is used will be described first.

The brackets 21, 21' support bearings 36, 37 for a shaft 38 which forms a support for the part. From the construction it will be seen that winding could be effected either from the shaft or from a collar or sleeve about the shaft. It is found more convenient to wind from the shaft and accordingly recess and thread its end at 39 to receive the winding key.

The shaft forms a support for the loose initial and transmission sleeves 40, 41 within the springs of the pair. The "initial" sleeve is the first sleeve of the train in winding and hence may be considered as a "winding" sleeve. It is also the last sleeve of the train considered from the standpoint of holding the springs against unwinding at that end after they have been wound.

In order to form convenient connection between the supporting shaft and the winding sleeve 40 a connecting collar 42 is provided, keyed to the shaft as by set screw 43 and interfitting axially with the sleeve 40 so that the collar 42 will drive the sleeve 40. One member of the clutch mechanism hereinafter described is rigid with the collar.

The collar 42 carries a ratchet clutch member 44 having ratchet pockets 45 within which lie rollers 46 adapted to slip with rotation of the collar in winding direction. In the opposite direction of relative movement the rollers engage with the inner surface 47 of a fixed clutch drum 48 so as to hold the spring in wound position. The direction of the slope of the bottoms of the pockets will depend upon the intended direction of driving, which for convenience is here made counter-clock-wise to simplify the driving connection with the turntable.

The sleeve 40 need not be greater in axial length than the width required for proper coupling to the spring but is conveniently made somewhat longer than the spring width to make it more accessible for connection with the driving collar 42. The sleeve 40 is connected with the inner end of a spring 49, which is in turn coupled at its outer end by a plate 50 with the outer end of an oppositely wound spring 51. The inner end of spring 51 is in turn connected with the sleeve 41, here a duplicate of sleeve 40.

For convenience in identification the spring which is nearest the winding connection will be called the rear spring, and the other, which is wound wholly through the first will be called the forward spring.

The springs 49 and 51 are separated by any radially extending member 52, which is most conveniently in the form of a plate as illustrated. It may ride upon any of the adjoining parts such as upon the shaft. The method of its support is really immaterial as it comprises a floater merely to prevent axial interlapping of the springs.

The energy from driven sleeve 41 may be transmitted to the shaft 29 through a driven collar 54 interfitting longitudinally with sleeve 41 and carrying worm gear 55 which engages with the worm 56 on the main turntable shaft.

The unit spring pair is shown as enclosed within a casing which is a mere cover except in so far as its ends may be used to keep the plate 50 in line against lateral torsion. It is supported upon one of the sleeves in the illustration of Figure 3 and is closed by a face plate 58. The face plate is held in position by a circular spring 59 sprung into annular recess 60 of the casing.

In the broader aspects of the invention the detail of the driving and driven transmission sleeve and of the connecting plate are not involved but both of these are novel and will be claimed specifically and they will therefore be described.

The two sleeves 40, 41 are duplicates. They do not completely close, one or both sides folding or hooking back longitudinally and one side connecting with a hook bend on the inner end of its surrounding spring. These sleeves are conveniently made out of sheet metal curved interiorally at 61 to form the bearing upon the shaft, reversely turned at 62 and preferably also at 63 leaving space 64 for the key 65 of collar 42 or of collar 54 and exteriorly formed at 66 to form a preferably curved exterior surface against which the springs are wound. The reversely turned end or ends are spaced from the interior portion 61 as at 67 one of the edges or "ends" is exposed as a hook for spring attachment. In the illustration both are turned and both exposed, the edges 68, 69 being spaced circumferentially to give room for insertion of a hook end 70 upon the interior of the spring. As these oppositely turned ends are duplicates the hook end 70 of the spring can be inserted which ever way the sleeve is put in.

As the opposite ends are duplicates also it does not matter which end of the sleeve is put outwardly.

The outer ends of the springs are also hooked as shown at 71 so that the hook of the spring 49 will fit along approximately half of the length axially of either edge 72 of the plate 50 while the hook 71, at the upper end of the duplicate spring will fit over approximately the other half of the length axially of the other edge 72' of the plate.

Though other forms of floating connection are advantageous in the broader aspects of the invention, the thin band typified in the plate has a special value in its flatness and cooperation with a simple and strong spring fastening.

Neither spring need rigidly fasten to the plate 50, the plate remaining in place substantially perpendicular to both springs while floating around the shaft as the springs are wound up and uncoil.

Whatever tendency there may be for the plate to turn diagonally, no such turning is apparent. It will be noted that the arm of the turning moment is the very small distance between the springs while the arm of the balancing moment is the width of the plate, many times as great. Further it will be noted that diagonal turning of the plate would spread the springs apart which is resisted by the hold of the spring ends upon the plate directly edgewise to spreading, i. e., parallel to the spring axes.

In operation the winding key is inserted within the shaft 38 and is turned to wind, reverse (unwinding) movement of the spring being prevented by the roller clutch. As the "first" spring, 49, is wound it carries the "second" with it at approximately half the angular speed (measured at the outer end of the second spring) as compared with the winding speed. The plate 50 also travels approximately half the angular distance during the winding and the other half during the running of the motor. The two springs divide the winding torsion according to their strength.

During this winding operation the plate 50 not only turns circumferentially but also tightens up toward the center as the outer turns of the two springs contract, floating freely to equalize the tension of the two springs. The cover 57 need perform no function in this except to protect the parts from dust and mechanical interference but its ends may be used to support the side edges of plate 50 against turning in tangential planes.

When the operated shaft is free to turn the springs gradually unwind together until both are unwound. The plate 50 unwinds approximately half as many revolutions as the sleeve 41.

The sleeves 40 and 41 are preferably accessible from the ends of the cover casings for oiling purposes.

In the other figures groupings of spring unit pairs unite any desired number of pairs in series to form a single composite spiral to operate as one long unit.

In Figure 10 two spring unit pairs are shown axially in line and in Figure 12 this number is increased to three. Because of greater compactness and lowered friction it is desirable to place all of the unit pairs used axially in line if the space available permit, since the increase in bulk is merely that of the additional unit pair and the same winding mechanism, shaft and shaft bearings ordinarily suffice. With an excessive length of shaft additional bearing support can of course be given intermediate the pairs.

Describing next Figures 10 and 11, two spring unit pairs are shown each almost identical with the single unit pair shown in Figures 1 to 6.

The shaft 38' however is longer than the shaft 38 and there is a long coupling sleeve 73 between the two unit pairs, one end of this sleeve taking the place in the right-hand pair of the sleeve 41 and the other end of the sleeve taking the place in the left-hand pair of the sleeve 40.

The sleeve 73 is shown in Figure 8 and is of the same character exactly as the sleeve 40, 41 shown in Figure 7 differing from it only in having additional length. The cover casing 57 of the one pair and the end plate 58 of the other are given support upon this sleeve.

Figure 14:
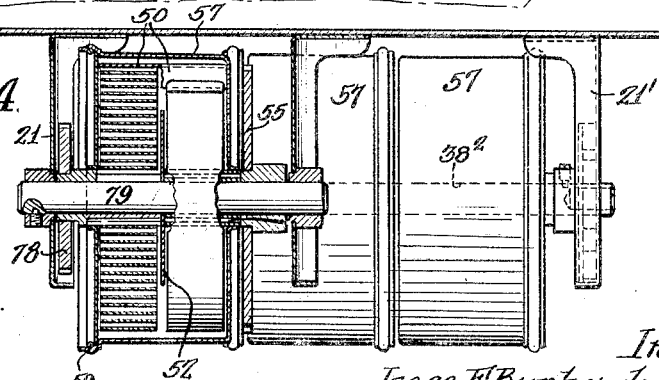
Figure 14 is a section of Figure 12 taken upon line 14—14.

In Figures 12, 13 and 14 a set of three unit pairs is mounted upon a single shaft. This is the structure of Figures 10 and 11, except that an additional pair has been added, using an additional sleeve 73 to connect the second and third pairs, and the sleeve 54 driven by the sleeve 41 instead of connecting by a spiral gear with the worm wheel 56 is shown as connecting through gear 75, idler 76 upon stud shaft 77 with a gear 78 mounted upon driving sleeve 42' of a fourth unit pair of springs, connected as in Figures 1 to 6 to the turntable 28.

The spring unit pair shown in section in Figure 14 as mounted upon a shaft parallel with the initial winding shaft is a duplicate of the spring unit pair of Figures 1—6. Additional spring unit pairs may be mounted to its right, suitably extending the shaft 79.

It will be seen that the spring unit pairs may not only be mounted to any desired extent in series along the same shaft as shown in Figures 10 and 11 and in Figures 12 and 13 but one or more spring unit pairs may be mounted upon connected shafts as in Figures 12 and 13 to secure the additional length of any desired number of additional unit pairs.

It is sometimes desirable to wind in reverse direction from that of the ratchet clutch 44. Obviously, this may be readily accomplished as illustrated in Figures 15 and 16 where an auxiliary winding shaft 80 is supported on bracket 21' in a suitable bearing 81 and carries a spur gear 82 engaging a gear 83 upon a driving sleeve 42². The latter gear may be rigid with or rotatable upon the shaft 38.

Figure 17:
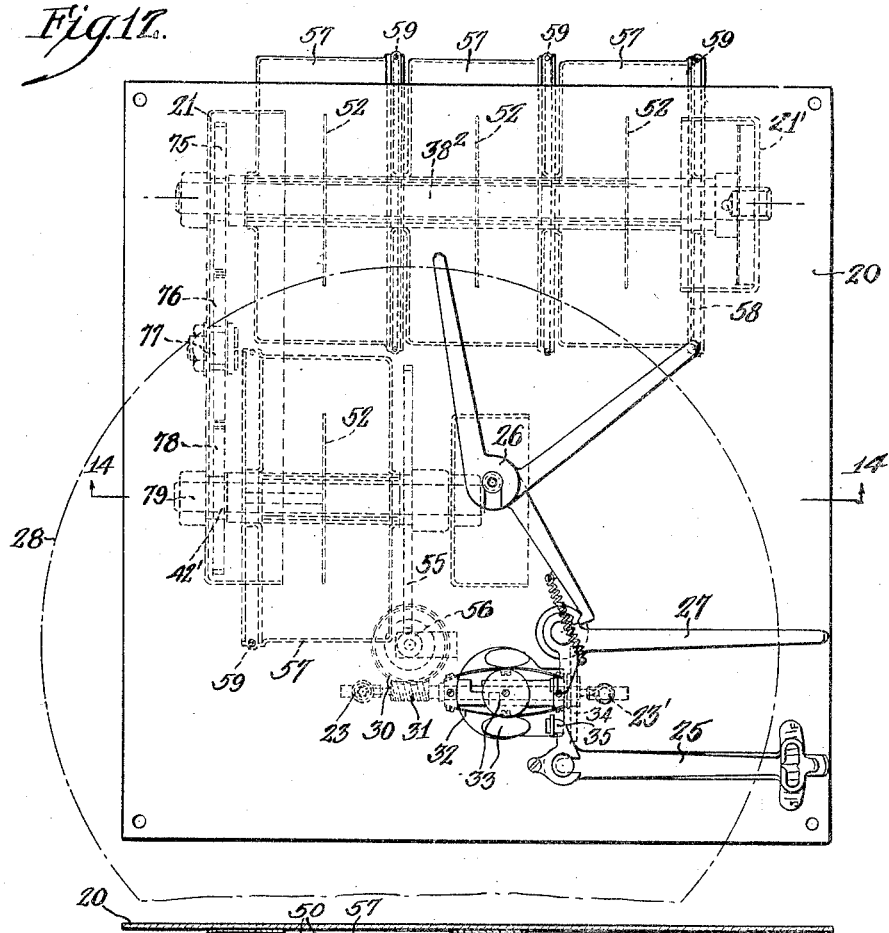
Figure 17 is a top plan view similar to Figures 1, 10 and 12, showing a different way of building up a unit pair of springs to obtain a long run.

Obviously composite springs on any number of different shafts may be united by suitable gearing (spur or bevel) in series or in parallel or both. This is shown in Figure 17 where a spring unit 84 upon shaft 85 connects by driving gear 86 and idler 87 to gear 75 of the composite spring arrangement shown in Figure 12.

The effect of thus connecting an auxiliary driving unit 84 in parallel with the driving unit 88 is obviously that of increasing the strength but not the length of the ultimate drive. As indicated in Figure 17, when units upon different shafts are connected to drive in parallel it is desirable to wind at the longer unit (as at 89 of Figure 17), the corresponding end of the shorter unit being fixed as at 90. It will also usually be desirable to have the length of composite spring in the units 84 and 91 substantially the same inasmuch as they are geared together.

Obviously the idlers 87 and 77 may be dispensed with if an increased size for the gears 86, 75 and 78 is not objectionable, as there is no necessity nor even particular advantage in having these gears all revolve in the same direction. The parts on the composite spring of each shaft are interchangeably adapted to assembly for driving in either direction, it being substantially equally easy to assemble for one direction of drive as for the other.

While for greater ease of manufacture and assembly it is usually preferred to have all the springs of equal strength and length, this is not essential and in specific cases it may be advantageous to use springs of different strength and length; for example, where many springs are connected together in series they may be made progressively weaker, with the strongest spring at the winding end of the series, difference in frictional resistance, greatest at the winding end.

In view of the invention and disclosure variations and modifications will doubtless become evident to others skilled in the art to meet individual whim or particular need and all such is claimed in so far as they fall within the reasonable spirit and scope of the invention.

Having thus described the invention, what is claimed as new and is desired to secure by Letters Patent is:—

1. In a spring motor, a supporting shaft, a pair of sleeves thereon, a pair of oppositely spiraled springs about the sleeves, the one sleeve engaging one of the springs to wind it and the other engaged by the second spring to transmit the energy thereof, a floating arcuate plate extending transversely to the outer ends of both springs and hooks on the outer ends of the springs engaging opposite edges of opposite ends of the plate to transmit the energy of the first spring to the plate and from the plate to the second spring.

2. In a spring motor, a central shaft, a pair of oppositely spiraled springs surrounding the shaft, a spacer between the springs transverse to the shaft, a winding sleeve engaging the interior of one of the springs, a transmission sleeve engaged by the inner end of the second spring, a floating arcuate plate engaged at opposite ends and opposite sides by the outer ends of the two springs, means for turning the winding sleeve and clutch means for preventing reverse turning thereof.

3. In a spring motor, an outer casing, a pair of oppositely spiraled coaxial and axially spaced springs therein, supporting, winding and transmitting connections therefor, a plate free from the springs and casing, overlapping a considerable extent of the outer ends of both springs and hooks on the ends of the springs engaging opposite edges of the plate close to the adjacent sides of the two springs and tending to shear the plate.

4. In a spring motor, a supporting shaft, a sleeve thereon having an axially presented keyway in the end thereof, a winding collar having a key entering the keyway, means for preventing reverse turning of the winding collar, and a spring about the sleeve engaged by it for winding purposes.

5. In a spring motor, a supporting shaft, a pair of sleeves thereon having longitudinal keyways in their outer ends, a pair of oppositely spiraled springs respectively connected with said sleeves at their inner ends and connected together at their outer ends, a winding collar having a key fitting within the keyway of the first spring sleeve and a transmission collar having a key entering the keyway of the second spring sleeve.

6. In a spring motor, a supporting shaft, a pair of sleeves freely mounted and relatively axially spaced thereon, a pair of oppositely spiraled springs respectively connected with the sleeves at their inner ends, floating connection between the springs at their outer ends, a driving collar connected to rotate with the shaft, winding connections for the shaft, means for preventing reverse movement of the shaft and collar, key connections between the winding collar and first sleeve, a driven collar having a key connection with the second sleeve and gearing connected with the driven collar.

7. A supporting shaft, a pair of reversely wound spiral springs axially spaced along it, holding means at the inner end of one spiral, power transmission means at the inner end of the other, a radially and circumferentially floating connection between the outer ends of the springs and a spacer between the springs located radially beneath the floating connection.

8. In a spring motor, a plurality of shafts, a plurality of alternately oppositely spiraled springs ranged along each shaft, floating series connection between the adjacent ends of the springs along each shaft forming a composite spring, a transmission member for each shaft surrounding it having operating connection with one end of its composite spring, driving connection between the transmission members linking the composite springs of the respective shafts into one major composite spring, holding means at one end of the major composite spring, and a driving member linked to the other end thereof.

9. In a spring motor, a plurality of shafts, a pair of oppositely spiraled springs surrounding each shaft, connection between the outer ends of the springs of each pair, winding connections for the inside of the spring of a pair upon the first shaft, a gear about the first shaft, connections between the inside of the second spring upon the first shaft with said gear, a gear upon the second shaft connected with the gear upon the first shaft, driving connections from the gear upon the second shaft with the inside of one spring of the pair upon the second shaft and transmission connections from the inner end of the second spring upon the second shaft.

10. In a spring motor, two parallel shafts, bearings therefor, a pair of oppositely spiraled springs on the first shaft, driving and driven sleeves connected with the inner ends of the respective springs on said shaft, floating connections between the outer ends of the springs of this pair, a gear connected with and coaxial with the driven sleeve, a gear on the second shaft operated by the gear on the first shaft, a pair of oppositely spiraled springs on the second shaft, floating connections between the outer ends thereof, driving and driven sleeves about the second shaft and connected to the inner ends of the respective second springs, connection between the driving sleeve and the gear about the second shaft and transmission connections from the inner end of the second spring upon the second shaft.

11. In a spring motor, a plurality of supporting shafts, the first being a winding shaft and the last a transmission shaft, a composite spiral about each shaft each comprising oppositely spiraled interconnected springs, series gearing between the spirals, holding means at one end of the series and power transmission means at the other to transmit the energy at all times through the transmission shaft.

12. In a spring motor, a shaft, bearings therefor and driving and driven sleeves about the shaft, oppositely spiraled coaxial springs about the shaft connected together at their outer ends and connected to the respective sleeves at their inner ends, gearing connections with the driven sleeve, a pair of shafts parallel with the first shaft, a pair of sleeves about each of these two shafts, gearing connections between each of these pairs of sleeves with the gearing connected with the first driven sleeve, a pair of coaxial oppositely spiraled springs about each of the two pairs of sleeves upon the additional shafts connected respectively to the sleeves of the corresponding pair, connections between the outer ends of the springs in each pair, and operating connections for the second sleeve of one of the additional pairs.

13. In a spring motor, a shaft, bearings therefor and driving and driven sleeves about the shaft, oppositely spiraled coaxial springs about the shaft connected together at their outer ends and connected to the respective sleeves at their inner ends, gearing connections with the driven sleeve, a pair of shafts parallel with the first shaft, a pair of sleeves about each of these two shafts, gearing connections between each of these pairs of sleeves with the gearing connected with the first driven sleeve, a pair of coaxial oppositely spiraled springs about each of the two pairs of sleeves upon the additional shafts connected respectively to the sleeves of the corresponding pair, connections between the outer ends of the springs in each pair, and operating connections for the second sleeve of one of the additional pairs, the other second sleeve being fixed against turning.

14. In a spring motor, a transmission sleeve open longitudinally and reversely folded along one side of the opening into a longitudinal tangential hook.

15. In a spring motor, a transmission sleeve open longitudinally and reversely folded to form a generally cylindrical surface broken to present a hook edge which is tangentially free.

16. In a spring motor, a transmission sleeve longitudinally open and reversely folded along both sides into oppositely directed hooks.

17. In a spring motor, a sleeve for spring attachment having general cylindrical form and presenting oppositely directed edges spaced circumferentially from each other and radially from the inner portion of the sleeve.

18. In a spring motor, a sleeve for spring attachment of general cylindrical form presenting circumferentially directed pockets accessible from the outside of the sleeve and a keyway accessible from the end.

19. A sleeve for spring connection comprising sheet material, cylindrically formed to approximately a cylinder, reversely turned leaving a key space and cylindrically formed to approximately a complete circle, leaving the edges of the metal spaced from each other and adapting the outer cylinder for spring attachment.

20. A sleeve for spring motor support and operation of general cylindrical shape having an end keyway and having a side opening for hook attachment beneath the cylindrical surface.

21. In a spring motor, a sleeve for spring attachment of approximately cylindrical shape having a longitudinal key opening the length of the sleeve and having a circumferential opening for hooked attachment.

22. In a spring motor, a sleeve for spring attachment of approximately cylindrical shape having a longitudinal key opening the length of the sleeve and having a radial and circumferential opening at a different part of the circumference for hooked attachment.

MANIE E. BURTON,
*Executrix of the Estate of Isaac F. Burton, deceased.*